United States Patent [19]
Frazier

[11] 3,883,156
[45] May 13, 1975

[54] BUMPER-ACTUATED TRIGGER MECHANISM FOR VEHICLE SAFETY CRASH BAG

[76] Inventor: Wallace N. Frazier, 111 Richland Ave., Smyrna, Tenn. 37167

[22] Filed: Feb. 1, 1974

[21] Appl. No.: 438,940

[52] U.S. Cl. ............... 280/150 AB; 137/68; 222/5; 180/91; 293/2
[51] Int. Cl. ............................................ B60r 21/08
[58] Field of Search ....................... 180/91, 94, 103; 280/150 AB; 293/2, 5; 137/67, 68; 222/3, 5

[56] References Cited
UNITED STATES PATENTS

| | | | |
|---|---|---|---|
| 2,515,068 | 7/1950 | Young | 222/5 X |
| 2,842,372 | 7/1958 | D'Antini | 280/150 AB |
| 3,547,467 | 12/1970 | Pociask | 180/91 X |
| 3,625,178 | 12/1971 | Prachar | 180/103 X |
| 3,625,541 | 12/1971 | Frazier | 280/150 AB |
| 3,653,684 | 4/1972 | Plumer | 280/150 AB |
| 3,727,575 | 4/1973 | Prachar | 280/150 AB X |
| 3,731,843 | 5/1973 | Anderson | 280/150 AB |
| 3,789,949 | 2/1974 | Bortfeld | 180/91 |
| 3,815,703 | 6/1974 | De Lorean | 280/150 AB X |

*Primary Examiner*—Philip Goodman
*Assistant Examiner*—John P. Silverstrim
*Attorney, Agent, or Firm*—Harrington A. Lackey

[57] ABSTRACT

A device for inflating a vehicle safety crash bag, including a container for compressed gas having a rupturable diaphragm in communication with the air bag, a firing pin for rupturing the diaphragm, a latch mechanism for holding the firing pin in an inoperative position, a fluid pressure actuated trigger member for actuating the latch mechanism to release the firing pin, and a contractible container connected to the vehicle bumper for compressing gas within the contractible container upon impact of the bumper, the increased pressure being transmitted to the trigger member.

2 Claims, 2 Drawing Figures

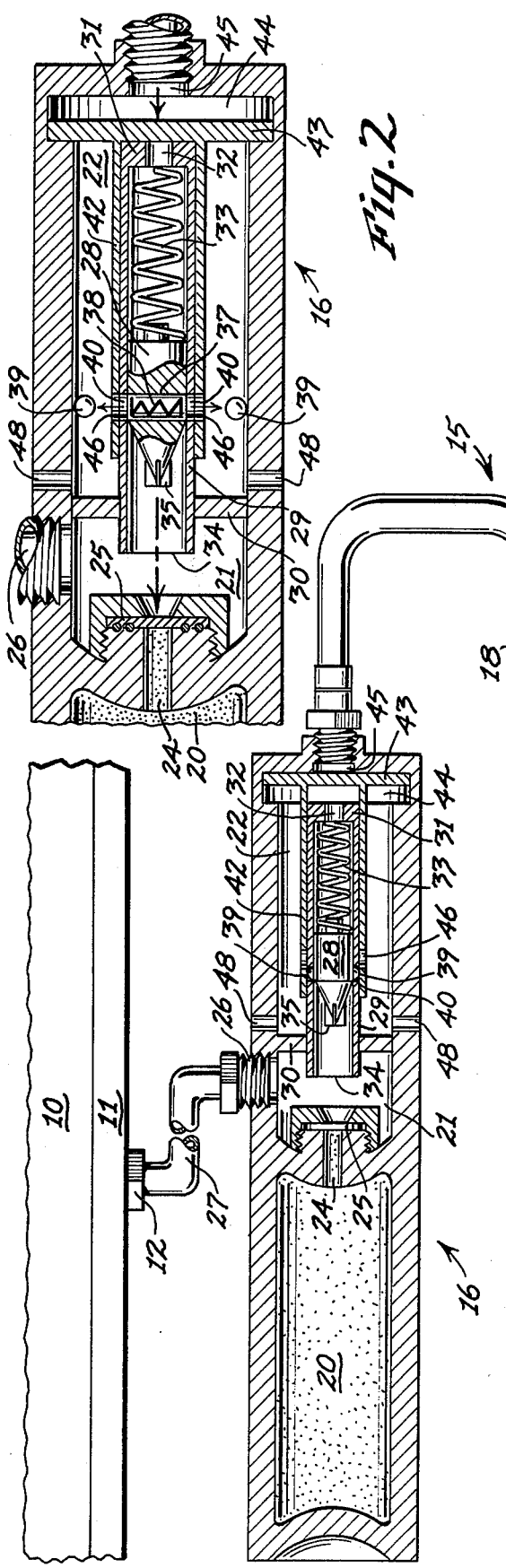
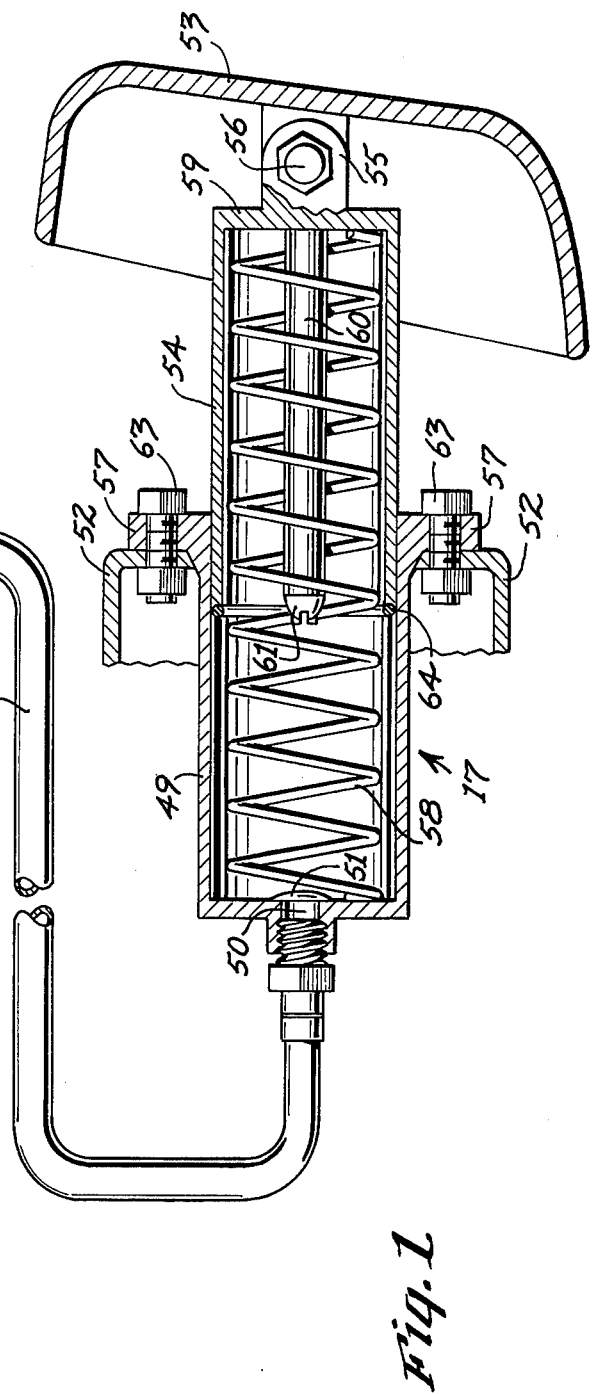

BUMPER-ACTUATED TRIGGER MECHANISM FOR VEHICLE SAFETY CRASH BAG

BACKGROUND OF THE INVENTION

This invention relates to inflatable crash bag devices, and more particularly to a bumper-actuated trigger mechanism for inflating a vehicle safety crash bag.

Vehicle safety crash bags, as well as various devices for inflating the crash bags, are well-known in the art.

Several of these crash bag inflating devices are disclosed in the following U.S. patents:

| | | |
|---|---|---|
| 3,625,541 | Wallace N. Frazier | Dec. 7, 1971 |
| 3,495,675 | Hass et al | Feb. 17, 1970 |
| 3,648,897 | Ranft | Mar. 14, 1972 |
| 3,649,045 | Smith | Mar. 14, 1972 |
| 3,654,412 | Haruna | Apr. 4, 1972 |
| 3,718,332 | Jones | Feb. 27, 1973 |
| 3,753,475 | Andersen | Aug. 21, 1973 |

SUMMARY OF THE INVENTION

It is an object of this invention to provide a combination bumper actuator and a trigger mechanism for inflating a vehicle crash bag in which the impact transfer medium is compressed fluid.

It is a further object of this invention to provide a device for inflating a vehicle air bag, which is completely devoid of any electrical devices, and therefore is in no way dependent upon the electrical system of a vehicle.

More specifically, this invention includes a compressed gas container having a rupturable diaphragm in fluid communication with the vehicle air bag, and a firing pin held in its inoperative position by a releasable latch mechanism for penetrating the diaphragm when released. The latch mechanism includes a pair of ball latches received in recesses in the side of the firing pin, the balls being biased partially outward into latch apertures in a tubular guide member receiving the firing pin. A fluid pressure actuated trigger member includes a piston plate and a sleeve having a release aperture. The sleeve is telescoped over the guide member for coaxial movement. The release aperture is aligned with the latch aperture, causing the latch balls to project radially through the aligned apertures in order to release the firing pin, when the trigger member is actuated by compressed fluid.

A contractible gas chamber is mounted in the front of the vehicle and connected to the vehicle bumper. Upon impact, gas within the contractible chamber is compressed. Upon attaining a predetermined pressure, the gas ruptures a diaphragm in the outlet port of the chamber, and permits the compressed gas to pass through a conduit to actuate the trigger member.

BRIEF DESCRIPTION OF THE DRAWINGS

FIG. 1 is a schematic view of the device in inoperative position with the bumper actuator mechanism and trigger mechanism disclosed in sectional elevations; and FIG. 2 is an enlarged fragmentary sectional elevation of the trigger mechanism disclosing the firing pin in its unlatched position.

DESCRIPTION OF THE PREFERRED EMBODIMENT

Referring now to the drawings in more detail, FIG. 1 discloses a deflated air bag or crash bag 10, of any conventional type, mounted on a support member 11, through which air is transferred to the air bag 10 from an inlet port 12.

The support member 11 may be mounted upon the steering wheel, dashboard or any other desirable place from which the rapidly inflated air bag 10 will be properly positioned to restrain the forward movement of the occupant of a vehicle upon sudden deceleration or impact.

The device 15 for inflating the air bag 10 includes a trigger housing 16 and a contractible chamber 17 connected in fluid communication by a fluid conduit 18, The trigger housing 16 is divided into three compartments, a compressed gas compartment 20, a gas discharge compartment 21 and an actuator compartment 22.

The compressed gas compartment 20 is adapted to receive any appropriate gas, or gases, under high pressure, such as dry nitrogen and/or liquid carbon dioxide. The outlet port 24 of the gas chamber 20 is sealed or closed by a rupturable diaphragm 25. When the diaphragm 25 is ruptured, the highly compressed gas, or gases, in chamber 20 rapidly exit through the outlet port 25, discharge chamber 21 and discharge port 26, which is connected to the air bag inlet port 12 by a fluid conduit, such as the flexible hose 27. If desired, in certain circumstances, the discharge port 26 could be directly coupled to the inlet port 12.

A firing pin 28 is received for longitudinal, axial, reciprocal movement within a tubular or cylindrical guide member 29 rigidly secured within the housing 16 by wall 30 separating the chambers 21 and 22. One end (the right end in FIGS. 1 and 2) of the guide member 29 is closed by an end wall 31 having a release port 32. A coil spring 33 is received within the guide member 29 between the firing pin 28 and the end wall 31 under sufficient compression that the spring 33 will force the firing pin 28 out the opposite open end 34 of the guide member 29 to puncture or pierce the diaphragm 25, in order to release the compressed gas within the chamber 20. The tip of the firing pin 28 may be provided with a plurality of cutter blades 35 for rupturing the diaphragm 25.

As best disclosed in FIG. 2, a transverse recess 37 in the firing pin 28 receives a latch spring 38, normally compressed to bias laterally outward a pair of latch spheres or balls 39 into opposing latch apertures 40 within the wall of the tubular guide member 29.

To hold the latch balls 39 in latched position within the latch apertures 40, a tubular or cylindrical sleeve 42 is telescopingly mounted axially over the tubular guide member 29, as disclosed in FIG. 1. The sleeve 42 terminates in a pressure plate or piston member 43 adapted to move axially a limited distance within a fluid piston chamber 44 within the same end of the housing 16 as the actuator chamber 22. The right end of the piston chamber 44, which is also the right end of the housing 16, is provided with an inlet port 45 coupled to the fluid conduit 18, which may be in the form of a flexible hose.

The sleeve 42 is also provided with a pair of release apertures 46, preferably of the same diameter as the latch apertures 40. The release apertures 46 are spaced from the piston member 43 a distance which will permit the release apertures 46 to register with the latch apertures 40 when the piston member 43 has been forced by compressed fluid in the piston chamber 44 to its left extreme position, as disclosed in FIG. 2. In this operative position, the latch balls 39 will be forced laterally through both registering apertures 40 and 46 into the actuator chamber 22, thereby releasing the firing pin 28. The energy within the compressed spring 33 is thereby released to rapidly thrust the firing pin 28 to its operative position penetrating the diaphragm 25 to release the compressed gas from the chamber 20.

Relief ports 48 are provided in the wall of the actuator chamber 22 to permit free axial reciprocal movement of the piston member 43 within the chamber 44.

The other end of the flexible conduit 18 is coupled to exhaust port 50 in the rear end wall of the stationary gas cylinder 49. However, in the preferred form of the invention, the exhaust port 50 is also covered or sealed by another rupturable diaphragm 51, which is adapted to rupture under gas pressure of a predetermined value.

The gas cylinder 49 is preferably fixed to the vehicle frame 52 adjacent the front of the vehicle and proximate to the vehicle bumper 53, by means such as mounting bracket 57 and bolts 63.

Reciprocable within the open front end of the cylinder 49 is a telescoping wall member, in the form of an opposed open-end movable cylinder, the telescoping cylinders 49 and 54 constituting the contractible chamber 17. The front wall 59 of the movable cylinder 54 is provided with a lug 55 for connection to the bumper 53 by connecting pin 56.

The movable wall member or cylinder 54 is normally maintained in its expanded position, disclosed in FIG. 1, with the bumper 53 protracted, by means of a coil spring 58. Projecting rearward from the front wall 59 is a prong 60 having a sharp cutter end 61 adapted to penetrate and rupture the diaphragm 51 when the cylinder 54 has moved far enough rearward into the stationary cylinder 49.

No relief ports are provided in the pressure chamber 17. Thus, as the impact of the bumper 53 against an obstacle forces the cylinder 54 to retract within the stationary cylinder 49, all of the gas, preferably air at atmospheric pressure, within the chamber 17, is compressed. When the diaphragm 51 is ruptured, the compressed gas is immediately transferred from the chamber 17 through the fluid conduit 18 into the pressure chamber 44 to rapidly force the piston member 43 to its operative position (FIG. 2) for releasing the firing pin 28.

The open end of the telescoping cylinder 54 may be provided with an O-ring 64 in order to minimize leakage between the telescoping walls of the movable cylinder 54 and the stationary cylinder 49.

The operation of this invention is apparent from the above description.

THe contractible compression unit or chamber 17 is fixed to the front portion of the vehicle frame 52 by means of the mounting bracket 57 and bolts 63 in such a manner that the telescoping cylinder 54 is protracted with the bumper 53 in a normal position for absorbing impacts.

The trigger housing 16 may be located in any of several positions, but preferably in the vicinity of the air bag 10. As previously mentioned, the housing 16 could be made a part of, or directly coupled to, the air bag support member 11, if desired. The chamber 17 and housing 16 are connected in fluid communication through a flexible hose 18 of the required length.

When the bumper 52 of the forwardly moving vehicle frame 52 suddenly encounters or engages an obstacle or object, with sufficient impact, the bumper 53 is thrust rapidly rearward, causing the telescoping cylinder 54 also to move rapidly rearward within the stationary cylinder 49, compressing the gases within the rapidly contracting space within the chamber 17.

When the telescoping cylinder 54 has been thrust rearward far enough, the cutter end 61 of the prong 60 penetrates the diaphragm 51 to rupture it and permit rapid flow of the compressed gas from the chamber 17 through the conduit 18 and into the piston chamber 44.

Initially, the piston 43 is in its inoperative position at the right hand end of the piston chamber 44 so that the apertures 46 and 40 are not in registry, and the firing pin 28 is latched in its inoperative position by the partial extension of the latch balls 38 within the latch apertures 40, as best disclosed in FIG. 1. However, when the compressed gas within the conduit 18 exerts its pressure upon the face of the piston member 43, the piston member 43 moves immediately toward the left of the chamber 44 to its full limit of movement, thereby registering the release apertures 46 with the latch apertures 40, and permitting the lateral radial discharge of the latch balls 39 into the actuator chamber 22. Thus, with the firing pin 28 unlatched, the force of the compressed spring 33 immediately urges the firing pin 28 to the left, until the cutter end 35 ruptures the diaphragm 35, thereby releasing the highly compressed gases within the chamber 20 to discharge through the port 26 and into the inlet port 12 of the bag support member 11. The air bag 10 is immediately inflated within fractions of a second after the impact of the bumper 53, to provide a large cushion restraining the forward movement of the occupant of the vehicle resulting from the impact.

In the event that the bumper impact is not great enough to develop sufficient compression to rupture the diaphragm 51, the bumper 53 nevertheless moves rearward a corresponding distance against the spring 58 and the compressed gas within the chamber 17. After the impact forces are removed, the released spring 58 and the compressed gas restore the bumper 53 to its original forward position.

It is also within the scope of this invention to transmit the pressure of the compressed gas within the contracted chamber 17 to piston 43 by means of a liquid, such as hydraulic fluid, within the fluid conduit 18.

It will be noted that none of the parts of the inflating device 15 include any electrical elements or electrical circuitry, or any parts relying on the electrical system of the vehicle. Accordingly, the device or system 15 will function completely independently of the other elements of the vehicle, except the frame 52 and the bumper 53. Thus, if the cause of the impact of the vehicle results from a faulty electrical circuit, battery, or disconnected wires or electrical elements in any part of the car, such fault will not affect the inflation of the air bag 10.

What is claimed is:

1. A device for inflating a vehicle safety crash bag comprising:
   a. a vehicle frame,
   b. a container on said frame containing compressed gas and having an outlet closed by a rupturable diaphragm, c. conduit means connecting said container outlet in fluid communication with a vehicle safety crash bag for inflation of said bag when said diaphragm is ruptured,
d. a firing pin,
e. latch means releasably holding said firing pin in an inoperative position spaced from and in alignment with said rupturable diaphragm,
f. means biasing said firing pin toward its operative position piercing said diaphragm,
g. a liquid chamber,
h. a piston member reciprocable within said liquid chamber between an inoperative position and an operative position,
i. operative means connecting said piston member and said latch means for releasing said firing pin to its operative position when said piston member is in its operative position,
j. a gas cylinder fixed upon said vehicle frame,
k. a contractible wall member reciprocably movable axially within said gas cylinder for compressing gas within said cylinder,
l. a vehicle bumper connected to said contractible wall member for movement therewith,
m. spring means in said gas cylinder normally biasing said wall member to an expanded inoperative position,
n. a liquid conduit, filled with liquid, in open fluid communication with said liquid chamber and connected to said gas cylinder,
o. an outlet port in said gas cylinder in fluid communication with said liquid conduit,
p. a second pressure-rupturable diaphragm closing said outlet port, and
q. means associated with said contractible wall means for rupturing said second diaphragm when said wall member is moved axially toward said cylinder a predetermined distance.

2. The invention according to claim 1 further comprising a tubular guide member receiving said firing pin for axial movement, said latch means comprising a latch element normally holding said firing pin in said tubular guide member, said piston member including a sleeve telescopingly receiving said tubular member, and release means on said sleeve for releasing said latch element when said piston member is in its operative position, for releasing said firing pin.

* * * * *